United States Patent
Ferris

(10) Patent No.: US 9,052,939 B2
(45) Date of Patent: Jun. 9, 2015

(54) DATA COMPLIANCE MANAGEMENT ASSOCIATED WITH CLOUD MIGRATION EVENTS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 513 days.

(21) Appl. No.: 13/118,123

(22) Filed: May 27, 2011

(65) Prior Publication Data

US 2012/0303776 A1 Nov. 29, 2012

(51) Int. Cl.
G06F 15/16 (2006.01)
G06F 9/455 (2006.01)
H04L 12/26 (2006.01)
H04L 29/08 (2006.01)
G06F 9/50 (2006.01)

(52) U.S. Cl.
CPC ............ *G06F 9/45558* (2013.01); *H04L 12/26* (2013.01); *H04L 29/08072* (2013.01); *G06F 9/5072* (2013.01); *G06F 2221/2101* (2013.01); *G06F 2221/2115* (2013.01); *G06F 2221/2151* (2013.01); *G06F 2009/45562* (2013.01)

(58) Field of Classification Search
CPC ..................... H04L 29/08072; H04L 12/26
USPC ........... 709/203, 220; 711/118, 154; 713/151; 370/252, 397
See application file for complete search history.

(56) References Cited

U.S. PATENT DOCUMENTS

| | | | |
|---|---|---|---|
| 8,112,471 B2 * | 2/2012 | Wei et al. | 709/202 |
| 8,417,938 B1 * | 4/2013 | Considine | 713/151 |
| 8,582,462 B2 * | 11/2013 | Sharma et al. | 370/252 |
| 2011/0137973 A1 * | 6/2011 | Wei et al. | 709/202 |
| 2012/0078643 A1 * | 3/2012 | Nagpal et al. | 705/1.1 |
| 2012/0089781 A1 * | 4/2012 | Ranade et al. | 711/118 |
| 2012/0110044 A1 * | 5/2012 | Nagpal et al. | 707/827 |
| 2012/0182992 A1 * | 7/2012 | Cowart et al. | 370/392 |
| 2012/0221696 A1 * | 8/2012 | Ferris | 709/223 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.

Jeffrey Darcy, "Systems and Methods for Searching a Cloud-Based Distributed Storage Resources Using a Set of Expandable Probes", U.S. Appl. No. 12/893,737, filed Sep. 29, 2010.

(Continued)

*Primary Examiner* — Khanh Dinh
(74) *Attorney, Agent, or Firm* — Lowenstein Sandler LLP

(57) ABSTRACT

A compliance tool can verify compliance with jurisdictional transfer and storage requirements for data migration into or within a cloud. The compliance tool can monitor and check data transfers and storage to determine if the data transfer and/or storage will cross jurisdictional boundaries. If the transfers or storage crosses jurisdictional boundaries, the compliance tool can identify the transfer and storage requirements of any jurisdictions involved with the transfer and/or storage. The compliance tool can verify that the data transfers complies with the identified transfer and storage requirements. If the data transfer and/or storage does not comply with the identified transfer and storage requirements, the compliance tool can terminate the data transfer and/or storage, modify the data transfer and/or storage, and/or modify the data, itself, to comply with the identified transfer and storage requirements.

16 Claims, 7 Drawing Sheets

(56) References Cited

OTHER PUBLICATIONS

Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.
James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for De-Populating Cloud Data Storage", U.S. Appl. No. 13/036,977, filed Feb. 28, 2011.
James Michael Ferris, "Systems and Methods for Migrating Data Among Cloud-Based Storage Networks Via a Data Distribution Service", U.S. Appl. No. 13/037,215, filed Feb. 28, 2011.
James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.
James Michael Ferris, "Systems and Methods for Establishing Upload Channels to a Cloud Data Distribution Service", U.S. Appl. No. 13/037,230, filed Feb. 28, 2011.
James Michael Ferris, "Methods and Systems to Automatically Extract and Transport Data Associated with Workload Migrations to Cloud Networks", U.S. Appl. No. 13/116,599, filed May 26, 2011.
James Michael Ferris, "Systems and Methods for Cloud Data Deployment Based on Preferential and/or Existing Subscription Relationships", U.S. Appl. No. 13/117,331, filed May 27, 2011.
James Michael Ferris, "Systems and Methods for Generating Optimized Host Placement of Data Payload in Cloud-Based Storage Network", U.S. Appl. No. 13/118,075, filed May 27, 2011.
James Michael Ferris, "Systems and Methods for Determining Consistencies in Staged Replication Data to Improve Data Migration Efficiency in Cloud Based Networks", U.S. Appl. No. 13/117,235, filed May 27, 2011.

* cited by examiner

DATA COMPLIANCE MANAGEMENT ASSOCIATED WITH CLOUD MIGRATION EVENTS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys computing resources such as processors, operating systems, software and other components that can be combined or strung together in an abstract structure or "cloud network" to form and support virtual machines. A user or customer can request the instantiation of a virtual machine or set of virtual machines from those resources from a central server or management system to perform intended tasks or applications. For example, a user may wish to set-up and instantiate a virtual server from the cloud network to create a storefront to market products or services on a temporary basis, for instance, to sell tickets to an upcoming sports or musical performance. The user can lease or subscribe to the computing resources needed to build and run the virtual machines on a comparatively short-term basis, such as hours or days, for their intended application. Likewise, a user can utilize a cloud-based architecture to form a cloud network on existing computing resources owned by the user.

Often data stored in a cloud network is not fixed. As cloud resources because available or as a user adds new data to the cloud network, the location of data stored in the cloud network may change. Likewise, because the cloud network may be supported by geographically diverse computing resources, data may be stored in one jurisdiction, e.g. country, on a given day and stored in a different jurisdiction on a different day. The transient nature of data in a cloud network, and the diverse locations of computing resources supporting the cloud network present issues for data storage and data migration. Depending on the jurisdiction, the data may be subject to rules and laws governing the data storage, security, and access controls. For example, patient medical data stored in the United States is subject the Health Insurance Portability and Accountability Act (HIPAA), which governs how the patient medical data must be stored and accessed. Further, as data is moved in and out of different jurisdictions, the data may be subject to the import and export rules and laws of the jurisdictions. For example, software that might contain encryption technology or national security material is subject to United States export and import laws. Accordingly, cloud providers and users are presented with possible violations of jurisdictional rules and laws and subject to sanction of fines due to the storage and migration of data in cloud networks.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for automatically verifying compliance with jurisdictional transfer and storage requirements for data transfer and storage in a cloud computing environment. According to embodiments, a compliance tool can verify compliance with jurisdictional transfer and storage requirements for data migration into or within a cloud. The compliance tool can monitor and check data transfers and storage to determine if the data transfer and/or storage will cross jurisdictional boundaries. If the transfers or storage crosses jurisdictional boundaries, the compliance tool can identify the transfer and storage requirements of any jurisdictions involved with the transfer and/or storage. The compliance tool can verify that the data transfers complies with the identified transfer and storage requirements. If the data transfer and/or storage does not comply with the identified transfer and storage requirements, the compliance tool can terminate the data transfer and/or storage, modify the data transfer and/or storage, and/or modify the data, itself, to comply with the identified transfer and storage requirements.

By automatically verifying compliance of data migrations with jurisdictional transfer and storage requirements, cloud providers and cloud users can freely move data without the worry of violating jurisdictional rules and laws. Accordingly, the data compliance tool allows the cloud providers and cloud users flexibility in data storage and migration without the added effort of personally checking the compliance of every data migration.

Figure 1:
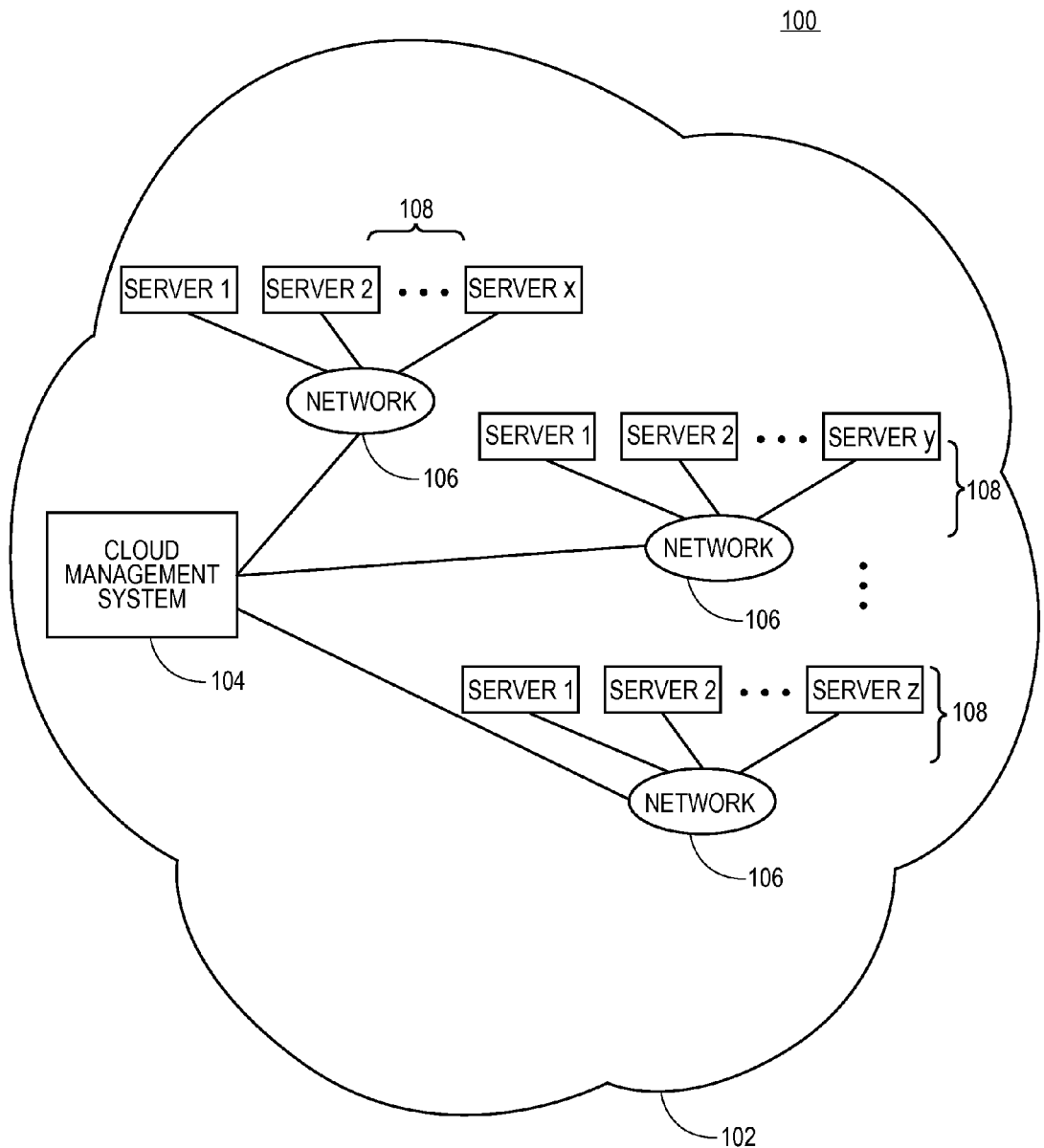
FIG. 1 illustrates an example of a cloud computing environment in which various embodiments of the present teachings can be practiced.

FIG. 1 illustrates an overall cloud computing environment 100 in which software from different vendors can be provided in a cloud, and systems and methods for identifying compatible software, provided by the different vendors, in the cloud, according to embodiments of the present teachings. As used herein, a "cloud" can comprise a collection of resources that can be invoked to instantiate a virtual machine, software appliance or other process for a limited or defined duration. As shown for example in FIG. 1, the collection of resources supporting a cloud 102 can comprise resource servers 108 configured to deliver computing components needed to instantiate a virtual machine, software appliance, or other process. For example, one group of the resource servers 108 can host and serve an operating system or components thereof to deliver to and instantiate a virtual machine. Another group of the resource servers 108 can accept requests to host computing cycles or processor time, to supply a defined level of processing power for a virtual machine. A further group of the resource servers 108 can host and serve applications to load on an instantiation of a virtual machine, such as an email client, a browser application, a messaging application, or other applications or software. Other types of resource servers are possible.

In embodiments, the entire set of the resource servers 108 or other hardware or software resources used to support the cloud 102 along with its instantiated virtual machines, software appliances, or other processes can be managed by a cloud management system 104. The cloud management system 104 can comprise a dedicated or centralized server and/or other software, hardware, and network tools that communicate via one or more networks 106 such as the Internet or other public or private network with all of the resource servers 108 to manage the cloud 102 and its operation. To instantiate a new virtual machines, software appliances, or other processes, a user can transmit an instantiation request to the cloud management system 104 for the particular type of virtual machine, software appliance, or other process they wish to invoke for their intended application. A user can for instance make a request to instantiate a set of virtual machines configured for email, messaging or other applications from the cloud 102. The request can be received and processed by the cloud management system 104, which identifies the type of virtual machine, software appliance, or other process being requested. The cloud management system 104 can then identify the collection of resources necessary to instantiate that virtual machine, software appliance, or other process. In embodiments, the instantiated virtual machines, software appliances, or other processes can, for example, comprise virtual transaction servers used to support Web storefronts, or other transaction sites.

In embodiments, the user's instantiation request can specify a variety of parameters defining the operation of the virtual machines, software appliances, or other processes to be invoked. The instantiation request, for example, can specify a defined period of time for which the instantiated virtual machine, software appliance, or other process is needed. The period of time can be, for example, an hour, a day, or other increment of time. In embodiments, the user's instantiation request can specify the instantiation of the virtual machines, software appliances, or other processes on a task basis, rather than for a predetermined amount of time. For instance, a user could request resources until a software update is completed. The user's instantiation request can specify other parameters that define the configuration and operation of the virtual machines, software appliances, or other processes. For example, the request can specify an amount of processing power or input/output (I/O) throughput the user wishes to be available to each instance of the virtual machines, software appliances, or other processes. In embodiments, the requesting user can for instance specify a service level agreement (SLA) acceptable for the virtual machines, software appliances, or other processes. Other parameters and settings can be used. One skilled in the art will realize that the user's request can likewise include combinations of the foregoing exemplary parameters, and others.

When the request to instantiate a virtual machines, software appliances, or other processes has been received and the necessary resources to build the virtual machines, software appliances, or other processes have been identified, the cloud management system 104 can communicate with one or more the resource servers 108 to locate resources to supply the virtual machines, software appliances, or other processes. The cloud management system 104 can select resources from any of the resource servers 108 to assemble the resources needed to build the requested virtual machines, software appliances, or other processes. It may be noted that in some embodiments, permanent storage such as hard disk arrays may not be included or located within the resource servers 108 available to the cloud management system 104, because the virtual machines, software appliances, or other processes may be intended to operate on a purely transient or temporary basis. In embodiments, other hardware resources, software resources, or other resources not strictly located or hosted in the cloud can be leveraged as needed. For example, other software services that are provided outside of the cloud 102 and hosted by third parties can be invoked by in-cloud virtual machines, software appliances, or other processes. For further example, other non-cloud hardware and/or storage services can be utilized as an extension to the cloud 102, either on-demand, subscribed, or decided basis.

With the resource requirements identified, the cloud management system 104 can extract and build the virtual machines, software appliances, or other processes on a dynamic or on-demand basis. For example, a group of the resource servers 108 can respond to an instantiation request for a given quantity of processor cycles with an offer to deliver that computational power immediately and guaranteed for the next hour. A further group of the resource servers 108 can offer to immediately supply communication bandwidth, for example on a guaranteed minimum or best-efforts basis. In other embodiments, the virtual machines, software appliances, or other processes can be built on a batch basis or at a particular future time. For example, a group of the resource servers 108 can respond to a request for instantiation at a programmed time with an offer to deliver the specified quantity of processor cycles within a specific amount of time, such as the next 12 hours.

The cloud management system 104 can select a group of the resource servers 108 that match or best match the instantiation request for resources needed to build the virtual machines, software appliances, or other processes. The cloud management system 104 can then coordinate the integration of the group of the resource servers 108, to build and launch the requested virtual machines, software appliances, or other processes. The cloud management system 104 can track the integrated group of the resource servers 108, or other distributed resources that are dynamically or temporarily combined, to produce and manage the requested virtual machines, software appliances, or other processes.

In embodiments, the cloud management system 104 can generate a resource aggregation table that identifies the group of the resource servers 108 that will be used to supply the resources for the virtual machines, software appliances, or other processes. The resource servers 108 can be identified by unique identifiers such as, for instance, Internet Protocol (IP) addresses or other addresses. The cloud management system 104 can register the group of the resource servers 108 contributing to the virtual machines, software appliances, or other processes.

The cloud management system 104 can then set up and launch the initiation process for the virtual machines, software appliances, or other processes to be delivered from the cloud 102. The cloud management system 104 can for instance transmit an instantiation command or instruction to the group of the resource servers 108 providing resources to the virtual machines, software appliances, or other processes. The cloud management system 104 can receive a confirmation message back from each server in the group of the resource servers 108 indicating a status regarding the provisioning of their respective resources. Each of the resource servers 108 can confirm, for example, the availability of a dedicated amount of processor cycles, amounts of electronic memory, communications bandwidth, or applications or other software prepared to be served.

Figure 2:
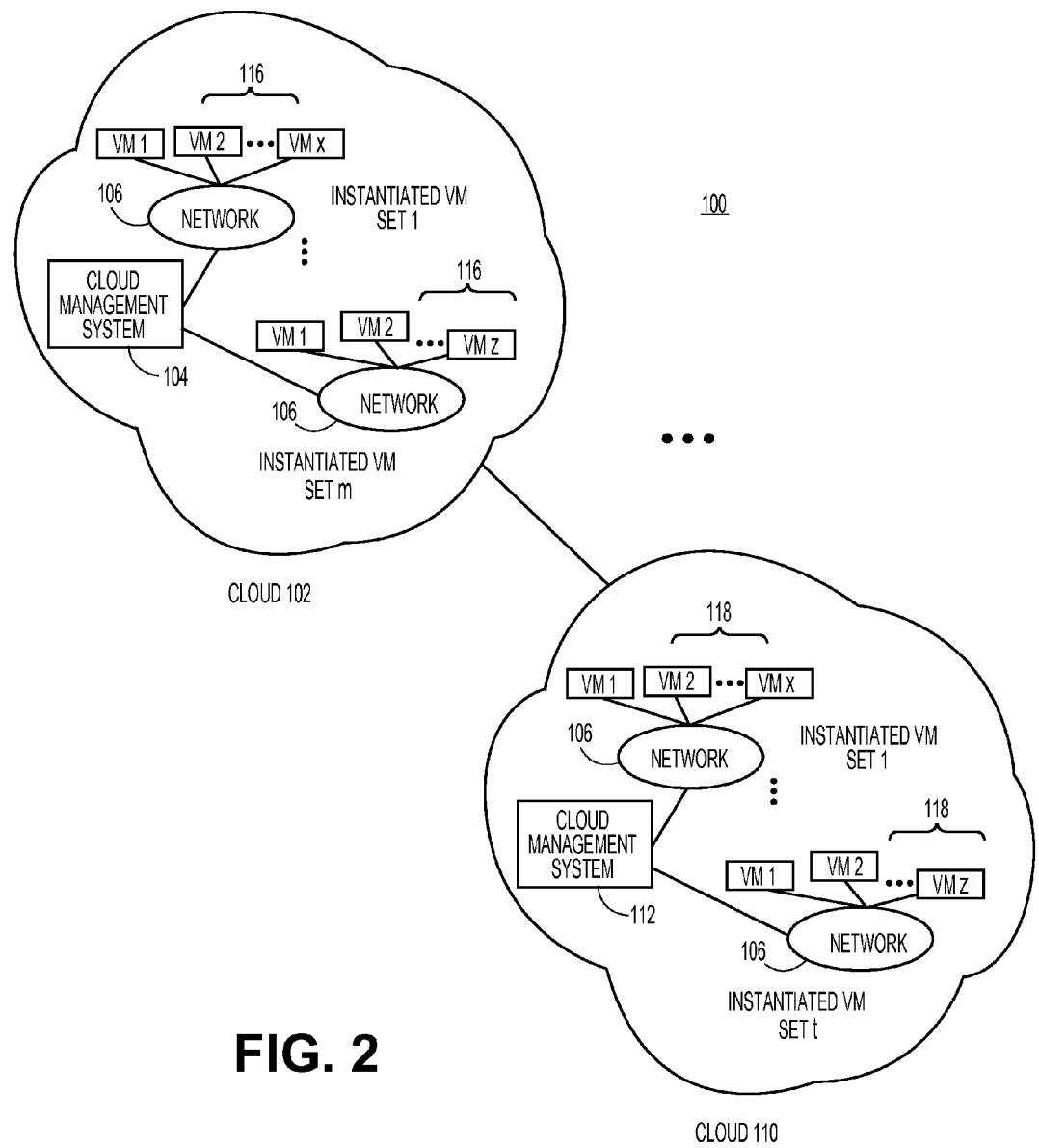
FIG. 2 illustrates another example of the cloud computing environment in which various embodiments of the present teachings can be practiced in another regard including multiple cloud arrangements, according to various embodiments.

As shown for example in FIG. 2, the cloud management system 104 can then instantiate one or more than one set of virtual machines 116, software appliances (not shown), or other processes (not shown) on the resources supplied by the group of the resource servers 108. In embodiments, the cloud management system 104 can instantiate a given number, for example, 10, 500, 1000, or other number of virtual machines, software appliances, or other processes to be made available to users on a network 106, such as the Internet or other public or private network. Each virtual machine, software appliance, or other process can be assigned an instantiated machine ID that can be stored in the resource aggregation table, or other record or image of the instantiated virtual machines, software appliances, or other processes. Additionally, the cloud management system 104 can store the duration of each virtual machine, software appliance, or other process, and the collection of resources utilized by the complete set of virtual machines, software appliances, or other processes, for example as illustrated, the instantiated virtual machines 116.

In embodiments, the cloud management system 104 can further store, track and manage a user's identity and associated set of rights or entitlements to software, hardware, and other resources provided by the cloud 102. Each user that populates virtual machines, software appliances, or other processes in the cloud 102 can have specific rights and resources assigned and made available to them. The cloud management system 104 can track and configure specific actions that a user can perform, such as provision virtual machines, software appliances, or other processes with resources, configure virtual machines, software appliances, or other processes to desired specifications, submit jobs to virtual machines, software appliances, or other processes, manage other users of virtual machines, software appliances, or other processes, and other privileges or actions. The cloud management system 104 can further generate records of the usage of virtual machines, software appliances, or other processes, for example virtual machines 116, to permit tracking, billing, and auditing of the resources consumed by the user. In embodiments, the cloud management system 104 can, for example, meter the usage and/or duration of the instantiated virtual machines 116, to generate subscription billing records for a user that has requested resources for those machines. Other billing or value arrangements are possible.

The cloud management system 104 can configure each virtual machine, software appliance, or other process to be made available to users of the one or more networks 106 via a browser interface, or other interface or mechanism. Each virtual machine, software appliance, or other process can communicate with the cloud management system 104 and the resource servers 108 supporting virtual machines, software appliances, or other processes via a standard Web application programming interface (API), or via other calls or interfaces. The virtual machines, software appliances, or other processes, for example instantiated virtual machines 116, can likewise communicate with each other, as well as other sites, servers, locations, and resources available via the Internet or other public or private networks, whether within a given cloud 102 or between clouds.

It may be noted that while a browser interface or other front-end can be used to view and operate virtual machines, software appliances, or other processes, for example the virtual machines 116, from a client or terminal, the browser interface or other front-end required to view the virtual machines, software appliances, or other processes can be hosted remotely in the cloud 102. In embodiments, the virtual machines, software appliances, or other processes, for example, the virtual machines 116 or other resources may not depend on or require the user's own on-premise hardware or other resources. In embodiments, a user can therefore request and instantiate virtual machines, software appliances, or other processes on a purely off-premise basis, for instance to build and launch a virtual storefront or other application.

Because the cloud management system 104 in one regard specifies, builds, operates and manages the virtual machines, software appliances, or other processes, for example, the virtual machines 116 on a logical level, the user can request and instantiate virtual machines, software appliances, or other processes on a real-time or near real-time basis, without a need to specify or install any particular hardware. The user's virtual machines, software appliances, or other processes, such as the instantiated virtual machines 116, can be scaled up or down immediately or virtually immediately on an on-demand basis, if desired. In embodiments, the resource server 108 that are accessed by the cloud management system 104 to support the virtual machines, software appliances, or other processes can change or be substituted, over time. The type and operating characteristics of the virtual machines, software appliances, or other processes, for example the instantiated virtual machines 116, can nevertheless remain constant or virtually constant, since instances are assembled from abstracted resources that can be selected and maintained from diverse sources based on uniform specifications.

In terms of network management of the virtual machines, software appliances, or other processes, such as the instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate the software and hardware resources on individual resource servers 108 or the virtual machines, software appliances, or other processes, themselves. The cloud management system 104 can monitor the virtual machines, software appliances, or other processes to detect any virus or other rogue process on individual virtual machine, software appliance, or other process, and for instance terminate the infected virtual machine, software appliance, or other process. The cloud management system 104 can likewise manage the virtual machines, software appliances, or other processes, for example, the instantiated virtual machines 116 on a collective basis, for instance, to push or deliver a software upgrade to all virtual machines, software appliances, or other processes. Other management processes are possible.

In embodiments, more than one set of virtual machines, software appliances, or other processes can be instantiated in a given cloud at the same, overlapping or successive times. The cloud management system 104 can, in such implementations, build, launch and manage multiple sets of virtual machines, software appliances, or other processes based on the same or different underlying resource servers 108, such as may be requested by different users. The cloud management system 104 can institute and enforce security protocols in a cloud 102 hosting multiple sets of virtual machines, software appliances, or other processes. Each of the individual sets of virtual machines, software appliances, or other processes can be hosted in a respective partition or sub-cloud of the resources of the cloud 102. The cloud management system 104 of the cloud 102 can for example deploy services specific to isolated or defined sub-clouds, or isolate individual virtual machines, software appliances, or other processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud 102 as a common utility while retaining the assurance that their information is secure from other users of the cloud 102. In further embodiments, the sub-clouds can nevertheless be configured to share resources, if desired.

In embodiments, the virtual machines, software appliances, or other processes generated in the cloud 102 can also interact with the virtual machines, software appliances, or other processes generated in a second cloud 110. For example, as illustrated in FIG. 2, the instantiated virtual machines 116 can also interact with virtual machines 118 of the cloud 110. The cloud management system 104 of the cloud 102 can interface with the cloud management system 112 of the cloud 110, to coordinate those domains and operate the clouds and/or can also interact with on a combined basis. The cloud management system 104 of the cloud 102 can track and manage virtual machines, software appliances, or other processes instantiated in the cloud 102, as well as virtual machines, software appliances, or other processes in the cloud 110. Additionally, when instantiate the virtual machines, software appliances, or other processes, a portion of the virtual machines, software appliances, or other processes can be instantiated in the cloud 102 and a portion of the virtual machines, software appliances, or other processes can be instantiated in the cloud 110.

In the foregoing and other embodiments, the cloud 102 can offer software programs of different vendors for use by the subscribers and customers of the cloud 102. For example, the subscriber and customers can buy, lease, or utilize, under a software as a service model (SaaS), the software programs. The software programs can include any type of software such as operating systems, such as a distribution of Linux provided by Red Hat™ Corporation, and various software programs requested or typically desired by subscribers, such as middleware applications, web hosting applications, electronic mail (email) applications, and the like. The software programs can include software programs provided by different vendors, for example Red Hat™ Corporation, Oracle®, and the like. The software programs can include any type of product and/or service provided by a vendor in the cloud 102. For example, the software programs can include operating systems and/or updates to these, application programs and/or updates to these, software appliances and/or updates to these, and any combinations of operating systems, application programs and/or software appliances. The software programs can also include services provided by the vendor, for example, application services, data storage, identity management, security, communications, technical support, and/or other services. The vendors can offer the software programs in the cloud 102 under a variety of different schemes, such as offer for purchase, offer for lease, and/or offer for "on-demand" use under a subscription, for example, a Software as a Service (SaaS) model.

In the foregoing and other embodiments, the user making an instantiation request or otherwise accessing or utilizing the cloud 102 or 110 can be a person, customer, subscriber, administrator, corporation, organization, or other entity. In embodiments, the user can be or include another virtual machines, software appliances, or other processes. In further embodiments, multiple users or entities can share the use of virtual machines, software appliances, or other processes. Additionally, while the above description reference an off-premise or "public" cloud, the cloud computing environment illustrated in FIGS. 1 and 2 can be created and supported by computing resources owned and/or operated by the user in order to form a on-premise, local, or "private" cloud.

Figure 3:
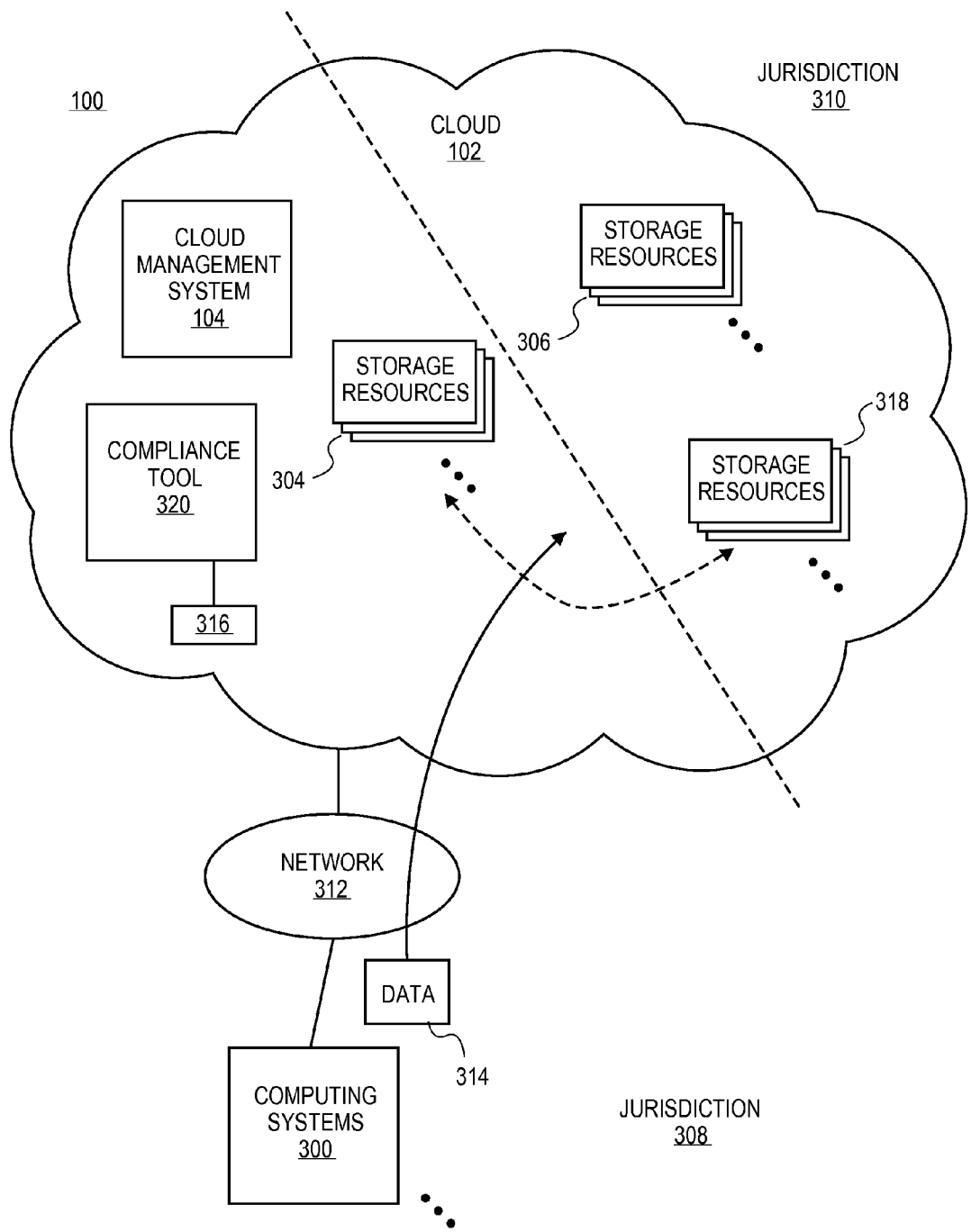
FIGS. 3 and 4 illustrate various examples of the cloud computing environment in which a compliance tool can check compliance of data that is being transferred or stored across jurisdictional boundaries, according to various embodiments.

FIG. 3 illustrates an example of the cloud computing environment 100 in which data can be moved into the cloud 102 from one or more computing systems 300, and a compliance tool 302 can automatically verify that the transfer of data into the cloud 102 and/or the storage of data in storage resources of the cloud 102 complies with jurisdictional transfer and storage requirements. While FIG. 3 illustrates various components of the cloud computing environment 100, one skilled in the art will realize that components can be added or removed.

The cloud computing environment 100 can include the cloud 102. The cloud 102 can include the hardware and software resources to support virtual machines, software appliances, or other processes, as described above, including the cloud management system 104. The cloud 102 can be any type of cloud that is controlled by any type of entity. For example, the cloud 102 can be an off-premise or "public" cloud that is owned and/or operated by a public cloud vendor, such as Amazon™, Inc., in order to provide the services of the cloud to subscribers and customers. Likewise, the cloud 102 can be created and supported by computing resources owned and/or operated by an entity and/or user in order to form a on-premise, local, or "private" cloud.

As illustrated in FIG. 3, the cloud 102 can include storage resources 304 and storage resources 306, which can be physically located in different jurisdictions. The storage resources 304 can be located in jurisdiction 308, and the storage resources 306 can be located in jurisdiction 310. As described herein, a jurisdiction can include any type of geographic and/or political division or sub-division, such as a city, county, state, country, and the like. For example, the jurisdiction 308 and the jurisdiction 310 can be different countries such as the United States and Canada or political divisions such as the European Union or countries covered by the North American Free Trade Agreement (NAFTA).

In embodiments, the one or more computing systems 300 can represent the computing systems owned and/or operated by an entity such as a user, a corporation, a company, a university, a governmental agency, and the like. The one or more computing systems 300 can include any type of conventional computing system, such as a desktop, laptop, server, thin-client, tablet computer, mobile phone, personal digital assistant, mainframe, etc., that are connected by wired or wireless networks. The one or more computing systems 300 can include a number of hardware resources, such as processors, memory, network hardware and bandwidth, storage devices, etc. and a number of software resources, such as operating systems, application programs, software appliances, virtual machines, etc. Additionally, the one or more computing systems 300 can be coupled to the cloud 102 by one or more communications networks 312. The one or more communications networks 312 can be or include the Internet, or other public or private networks. The one or more communications networks 312 can be or include wired, wireless, optical, and other network connections. One skilled in the art will realize that the one or more communications networks 312 can be any type of network, utilizing any type of communication protocol, to connect the cloud 102 and the one or more computing systems 300.

In embodiments, an entity that owns and/or operates the one or more computing systems 300 can desire to migrate data 314 to the cloud 102. The data 314 can include any type of data that can be supported by the cloud 102. For example, the data 314 can include operating systems, software application, software appliance, virtual machine, computing processes, and the like, that are supported by the one or more computing systems 300 that are being migrated to the cloud 102. Likewise, the data 314 can include any other information and data utilized by the operating systems, software application, software appliance, virtual machine, computing processes, and the like to perform their functions. For example, the data 314 can include files, databases, records, metadata, etc. utilized by the operating systems, software application, software appliance, virtual machine, computing processes, and the like to perform their functions.

In embodiments, the data 314, being transferred to and stored in the cloud 102, can cross jurisdictional boundaries. For example, based on availability in the cloud 102, the data 314 can be transferred and stored in the storage resources 306, which are located in jurisdiction 310. By crossing the jurisdictional boundary, the data 314 can be subject to rules, regulations, agency or administrative requirements, laws, treaties, etc. of the jurisdiction 308, jurisdiction 310, or both regarding the transfer and/or storage of the data 314 (hereinafter "requirements").

For the transfer of data 314 across jurisdictional boundaries, the jurisdiction 308, from which the transfer originates, can have requirements that govern the transfer of the data 314 outside its boundaries. The requirements of the jurisdiction 308 can be based on the jurisdiction, e.g. jurisdiction 310, to which the data 314 is being transferred. For instance, if the jurisdiction 308 is the United States, the United States can have requirements that prohibit the transfer of data to certain other countries that are under an embargo, sponsor terrorism, and the like. The requirements of the jurisdiction 308 can also be based on types of the data 314 which are based on the attributes of the data 314 such as subject matter, content, format, etc. For instance, if the jurisdiction 308 is the United States, the United States can have requirements that prohibit certain data, e.g. data relating to encryption or national security, to certain other countries that are unfriendly to the United States, sponsor terrorism, and the like.

Additionally, for the transfer of data across jurisdictional boundaries, the jurisdiction 310, which is receiving the data 314, can have requirements that govern the transfer of the data 314 into its boundaries. The requirements of the jurisdiction 310 can be based on the jurisdiction, e.g. jurisdiction 308, from which the data 314 originates. For instance, if the jurisdiction 310 is the United States, the United States can have requirements that prohibit the transfer of data, into its borders, that originate in other countries that are under an embargo, sponsor terrorism, and the like. The requirements of the jurisdiction 310 can also be based on a type of the data 314 that is being transferred into its borders. For instance, if the jurisdiction 310 is the United States, the United States can have requirements that prohibit certain data, e.g. money transfers, data relating to encryption or national security, from entering its borders from other countries that are unfriendly to the United States, sponsor terrorism, and the like.

Additionally, the storage of data in a different jurisdiction than its originates can be subject to requirements of the originating jurisdiction, e.g. the jurisdiction 308, and/or the jurisdiction where the data will be stored, e.g. jurisdiction 310. The requirements of either the jurisdiction 308 or the jurisdiction 310 or both can be based on the jurisdiction from which the data 314 originates, the jurisdiction where the data 314 will be stored, or both. Likewise, the requirements of either the jurisdiction 308 or the jurisdiction 310 or both can be based on the a type of the data being stored. For example, if the jurisdiction 308 is the United States and the data 314 is patient medical records, the United States has requirements under HIPAA that govern the storage of patient medical records, such as particular security requirements for storing the data 314, access control requirements, and data backup requirements, but the jurisdiction 310, for example, Canada, may not have the same requirements. If the storage resources 306 located in jurisdiction 310, do not meet the requirements of the jurisdiction 308, e.g. United States, the storage of the data 314 in the storage resources 306 can violate the requirements of the jurisdiction 308.

When the data 314 is transferred from the jurisdiction 308 to the jurisdiction 310 and/or stored in the jurisdiction 310 violates the requirements of the jurisdiction 308 or the jurisdiction 310 or both, the entity associated with the data 314, the operator of the cloud 102, or both can be subject to penalties and sanctions by the jurisdiction 308 or the jurisdiction 310 or both. As such, it is necessary to verify that the transfer from the jurisdiction 308 to the jurisdiction 310 and/or storage in the jurisdiction 310 does not violate the requirements of the jurisdiction 308 or the jurisdiction 310 or both.

In embodiments, the compliance tool 302 can be configured to verify that the transfer from the jurisdiction 308 to the jurisdiction 310 and/or storage in the jurisdiction 310 does not violate the requirements of the jurisdiction 308 or the jurisdiction 310 or both. To verify compliance, the compliance tool 302 can be configured to check each data transfer in the cloud 102 to determine if the data transfer crosses jurisdictional boundaries. If the data transfer crosses jurisdictional boundaries, e.g. transfer of the data 314 from jurisdiction 308 to jurisdiction 310, the compliance tool 302 can be configured to verify that the transfer complies with the requirements of the jurisdiction 308 or the jurisdiction 310 or both. Likewise, if the data is being stored in a jurisdiction other than the jurisdiction it originates, e.g. the storage of the data 314 in the storage resources 306 located in the jurisdiction 310, the compliance tool 302 can be configured to verify that the storage of the data 314 complies with the requirements of the jurisdiction 308 or the jurisdiction 310 or both.

The compliance tool 302 can be implemented as a software program that is configured to perform the verification as described herein. Likewise, the compliance tool tool 302 can be implemented as a portion of other software programs, such as the cloud management system 104. In either case, the compliance tool 302 can be configured to include the necessary logic, commands, instructions, and protocols to perform the processes described herein. In any implementation, the compliance tool 302 can be written in any type of conventional programming language such as C, C++, JAVA, Pert, and the like. While FIG. 3 illustrates the compliance tool 302 being executed in the cloud 102, the compliance tool 302 can be executed on any computing system in the cloud computing environment 100. For example, the compliance tool 302 can be executed on the one or more computing system 300.

In embodiments, to verify the compliance, the compliance tool 302 can be configured to identify any data, for example, the data 314, being transferred into the cloud 102. The compliance tool 302 can be configured to identify transfer, prior to or simultaneously with, the transfer of the data 314. For example, the compliance tool 302 can be configured to receive a notification, from the cloud management system 104, of the data 314 being transferred into the cloud 102. To achieve this, the compliance tool 302 can be configured to include the necessary logic, commands, instructions, and protocols to communicate with the cloud management system 104. Likewise, the compliance tool 302 can be configured to receive the notification from other entities or systems such as the computing systems 300 and/or the entity and/or users associated with the computing systems 300. To achieve this, the compliance tool 302 can be configured to include the necessary logic, commands, instructions, and protocols to communicate with the computing systems 300, the entity and/or users via command line interfaces, graphical user interfaces (GUIs), and/or other communications channels such as email.

Additionally, to identify a data transfer, the compliance tool 302 can be configured to monitor for any data transfers into the cloud 102, for example, the transfer of the data 314. To achieve this, the compliance tool 302 can be configured to include the necessary logic, commands, instructions, and protocols to monitor, listen, and/or detect events, such as a request for a data transfer or a data transfer, occurring in the hardware and software resources of the cloud 102 and/or the cloud management system 104 to identify a data transfer and/or storage.

Once the compliance tool 302 has identified a data transfer, the compliance tool 302 can be configured to determine if the data transfer will cross jurisdictional boundaries and/or will be stored in a different jurisdiction than the data originated, for example, the transfer and storage of the data 314. To determine this, the compliance tool 302 can be configured to identify an originating jurisdiction, e.g. the jurisdiction 308, and a destination and/or storage jurisdiction, e.g. the jurisdiction 310. For example, the compliance tool 302 can be configured to identify the jurisdictions involved in the transfer by communicating with the cloud management system 104 and/or other entities or computing systems in the cloud computing environment 100. Likewise, the compliance tool 302 can be configured to examine the request for the transfer and/or storage of the data 314 and/or examine the data 314, itself, being transferred and/or stored. For example, the compliance tool 302 can be configured to identify that the data 314 is being transferred from jurisdiction 308 to jurisdiction 310 and that the data 314 is being stored in the storage resources 306 of the cloud 102, which are located in the jurisdiction 310. For instance, the compliance tool 302 can be configured to identify the network addresses of the computing systems 300, from which the data 314 originates, and the network addresses of the storage resources 306 and translate the network addresses into geographic locations.

Once the compliance tool 302 determines that the data 314 is being transferred and/or stored in different jurisdictions, the compliance tool 302 can be configured to determine if the transfer and/or storage of the data 314 complies with the requirements of any jurisdictions involved in the transfer and/or storage of the data 314, e.g. the jurisdiction 308 and the jurisdiction 310. To achieve this, the compliance tool 302 can be configured to maintain a record 316 of the requirements of any jurisdictions that can be involved in a transfer and/or storage of data. The record 316 can be any type of searchable data record system (e.g. database) that is capable of storing information about the data transfer and/or data storage requirements of any jurisdictions that can be involved in a transfer and/or storage of data. For example, the record 316 can store information describing the data transfer and/or data storage requirements of the jurisdiction 308 and the jurisdiction 310. The compliance tool 302 and/or a user of the compliance tool 302 can be configured to generate and/or update the record 316 based on the rules, laws, treaties, etc. of the jurisdictions that can be involved in a data transfer and/or data storage, for example, the rules, laws, treaties, etc. of the jurisdiction 308 and the jurisdiction 310. To identify whether the transfer and/or storage of the data 314 complies with the requirements of the jurisdiction 308 and/or the jurisdiction 310, the compliance tool 302 can be configured to extract, from the record 316, the requirements for the jurisdiction 308 and/or the jurisdiction 310.

To generate and utilize the record 316, the compliance tool 302 can be configured to include the necessary logic, commands, instructions, and protocols to generate the record 316, store data in the record 316, search the record 316, and extract data from the record 316. The compliance tool 302 can be configured to store the record 316 in computer readable storage devices or media (CD, DVD, hard drive, portable storage memory, etc.) whether associated with the cloud 102 or remotely located.

Once the requirements of the jurisdiction 308 and/or the jurisdiction 310 have been extracted, the compliance tool 302 can be configured to determine if the transfer and/or storage of the data 312 complies with the requirements of the jurisdiction 308 and/or the jurisdiction 310. The compliance tool 302 can be configured to determine if the transfer of the data 314 from the jurisdiction 308 to the jurisdiction 310 complies with the requirements of the jurisdiction 308 and/or the jurisdiction 310. For example, the compliance tool 302 can be configured to examine the requirements of the jurisdiction 308 and the jurisdiction 310 to determine if either the jurisdiction 308 or the jurisdiction 310 prohibits or restricts the transfer of any data to the other.

Likewise, the compliance tool 302 can be configured to determine if either the jurisdiction 308 and/or the jurisdiction 310 prohibits or restricts the transfer of a type of data, for example, encryption algorithms, to the other. If the jurisdiction 308 and/or the jurisdiction 310 prohibits the transfer of a type of data, the compliance tool 302 can be configured to determine the type of the data 314. The compliance tool 302 can be configured to communicate with the cloud management system 104 to identify the type of the data 314 being transferred into the cloud 102. Likewise, the compliance tool 302 can be configured to communicate with other entities or systems such as the computing systems 300 and/or the entity and/or users associated with the computing systems 300 to determine the type of the data 314. Additionally, the compliance tool 302 can be configured to examine the request for the transfer of the data 314 or examine the data 314, itself, being transferred to determine the type of data 314 being transferred. Once the type is determined, the compliance tool 302 can be configured to determine if the type of the data 314 complies with the requirements of the jurisdiction 308 and/or the jurisdiction 310. For example, the compliance tool 302 can be configured to determine if the jurisdiction 308 and/or the jurisdiction 310 prohibits and/or places restrictions on a certain type of data from being transferred and/or received.

Additionally, the compliance tool 302 can be configured to determine if the storage of the data 314 in the jurisdiction 310 complies with the requirements of the jurisdiction 308 and/or the jurisdiction 310. For example, the compliance tool 302 can be configured to examine the requirements of the jurisdiction 308 and/or the jurisdiction 310 to determine if either the jurisdiction 308 or the jurisdiction 310 or both prohibits or restricts the storage of any data and/or a type of data in the other. Likewise, the compliance tool 302 can be configured to determine if either the jurisdiction 308 or the jurisdiction 310 specifies certain types storage requirements for the storage of any data and/or a type of data, for example, patient medical record. The compliance tool 302 can be configured to determine, for the type of the data 314, if the storage resources that will be storing the data 314, e.g. storage resources 306, complies with the storage requirements of the jurisdiction 308 and/or the jurisdiction 310.

Once the compliance tool 302 determines if the transfer and/or storage of the data 314 complies with the requirements of the jurisdiction 308 and/or the jurisdiction 310, the compliance tool 302 can be configured to take further action based on the determined compliance. If the transfer and/or storage of the data 314 complies with the requirements of the jurisdiction 308 and/or the jurisdiction 310, the compliance tool 302 can be configured to allow the transfer and/or storage of the data 314. Likewise, the compliance tool 302 can be configured to notify the cloud management system 104, the computing systems 306, operators of the cloud 102, entities associated with the computing systems 300, and/or users of the computing system 300 that the transfer and/or storage of the data 314 complies with the requirements of the jurisdiction 308 and/or the jurisdiction 310.

If the transfer and/or storage of the data 314 does not comply with the requirements of the jurisdiction 308 and/or the jurisdiction 310, the compliance tool 302 can be configured to terminate the transfer and/or storage of the data 314, itself, and/or instruct other systems, entities, and/or users to terminate the transfer. For example, the compliance tool 302 can be configured to instruct the cloud management system 104 to terminate the transfer and/or storage. Likewise, the compliance tool 302 can be configured to instruct the computing systems 300, entities associated with the computing systems 300, and/or user of the computing systems 300 to terminate the transfer and/or storage of the data 314. Additionally, the compliance tool 302 can be configured to terminate, itself, the transfer and/or storage of the data 314.

Additionally, if the transfer and/or storage of the data 314 does not comply with the requirements of the jurisdiction 308 and/or the jurisdiction 310, the compliance tool 302 can be configured to modify the transfer and/or the storage of the data 314 so that it complies with the requirements of the jurisdiction 308 and/or the jurisdiction 310. For example, if the jurisdiction 310 prohibits the transfer and/or storage of the data 314 from the jurisdiction 308 or vice versa, the compliance tool 302 can be configured to modify the transfer and/or the storage of the data 314 so that it not transferred out of the jurisdiction 308 and/or is stored within the jurisdiction 308, for example, modify the transfer and storage to the storage resources 304 of the cloud 102. Likewise, for example, if storage resources 306 do not meet the requirements of the jurisdiction 310 and/or the jurisdiction 308, the compliance tool 302 can be configured to modify the transfer and/or the storage of the data 314 so that it transferred and stored in different storage resources that meet the requirements of the jurisdiction 308 and/or the jurisdiction 308, for example, the storage resources 304 and/or the storage resources 318 of the cloud 102.

Additionally, if the transfer and/or storage of the data 314 does not comply with the requirements of the jurisdiction 308 and/or the jurisdiction 310, the compliance tool 302 can be configured to modify the data 314 so that it complies with the requirements of the jurisdiction 308 and/or the jurisdiction 310. For example, if the jurisdiction 310 prohibits the transfer and/or storage of a type of data contained in the data 314 from jurisdiction 308 or vice versa, the compliance tool 302 can be configured to divide, break-up, and/or separate portions of the data 314 so that the prohibited portions are not transferred out of the jurisdiction 308 and/or is stored within the jurisdiction 308, for example, in the storage resources 304 of the cloud 102 while the allowed portions are transferred and/or stored in the storage resources 306. Likewise, for example, the requirements of the jurisdiction 310 and/or the jurisdiction 308 can specify a format and/or structure of the data 314, the compliance tool 302 can be configured to modify the data 314 so that the data 314 meets the requirements of the jurisdiction 308 and/or the jurisdiction 310.

To modify the transfer and/or storage of the data 314 and/or modify the data 314, the compliance tool 302 can be configured to modify the transfer, the storage, and/or the data 314, itself, and/or instruct other systems, entities, and/or users. For example, the compliance tool 302 can be configured to instruct the cloud management system 104 to modify the transfer, the storage, and/or the data 314. Likewise, the compliance tool 302 can be configured to instruct the computing systems 300, entities associated with the computing systems 300, and/or user of the computing systems 300 to modify the transfer, the storage, and/or the data 314. Additionally, the compliance tool 302 can be configured to modify, itself, the transfer, the storage, and/or the data 314.

In the exemplary embodiments as described above, the storage resources of the cloud 102 can be located in different jurisdictions. In other exemplary embodiments, the cloud 102, itself, can be located in a different jurisdiction from the one or more computing systems 300. In this case, the compliance tool 302 can be implemented on the one or more computing systems 300 and/or other computing systems within the jurisdiction where the data 314 originates. As such, the compliance tool 302 can be configured to verify compliance of the transfer of the data 314 to the cloud 102 prior to transferring the data 314 to the cloud 102 utilizing the processes described above. Likewise, the compliance tool 302 can be configured to verify compliance of the storage of the data 314 in the cloud 102 prior to the transferring the data 314 to the cloud utilizing the processes described above.

Figure 4:
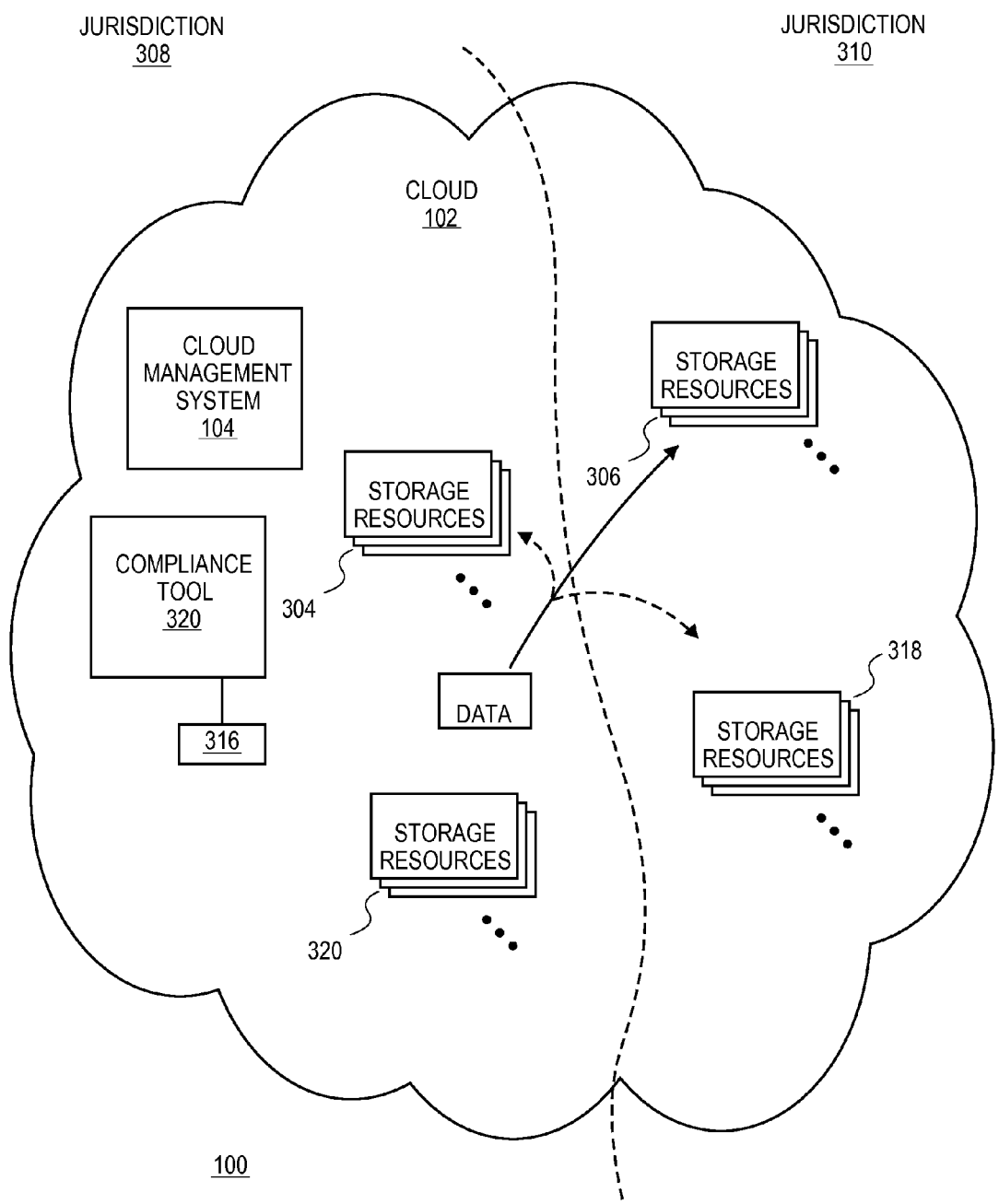

Accordingly to embodiments, the compliance tool 302 can also be configured to verify the compliance of data that is migrated within the cloud 102. FIG. 4 illustrates an example of the cloud computing environment 100 in which the data 314 can be migrated within the cloud 102, and the compliance tool 302 can automatically verify that the data 314 being migrated within the cloud 102 complies with the requirements of any applicable jurisdictional transfer and storage requirements. While FIG. 4 illustrates various components of the cloud computing environment 100, one skilled in the art will realize that components can be added or removed.

In embodiments, an entity that utilizes the cloud 102 and/or operates the cloud 102 (and/or computing systems associated with the cloud 102) can desire to migrate the data 314 within the cloud 102. For example, the entity can desire to upgrade or change the virtual machines and/or software offered by the cloud 102 to support the data 314. Likewise, for example, due to usage of the cloud 102, the cloud management system 104 can desire to move the data 314 from storage resources 320 to storage resources 306. As illustrated, the transfer and/or storage of the data 314 can cross jurisdictional boundaries within the cloud 102, e.g. from the jurisdiction 308 to the jurisdiction 310.

For transfers and/or storage within the cloud 102, the compliance tool 302 can be configured to verify that the transfer from the jurisdiction 308 to the jurisdiction 310 and/or storage in the jurisdiction 310 does not violate the requirements of the jurisdiction 308 or the jurisdiction 310 or both. To verify compliance, the compliance tool 302 can be configured to check each data transfer in the cloud 102 to determine if the data transfer crosses jurisdictional boundaries within the cloud 102. If the data transfer crosses jurisdictional boundaries, e.g. transfer of the data 314 from jurisdiction 308 to jurisdiction 310, the compliance tool 302 can be configured to verify that the transfer complies with the requirements of the jurisdiction 308 or the jurisdiction 310 or both. Likewise, if the data is being stored in a jurisdiction other than the jurisdiction it originates, e.g. the storage of the data 314 in the storage resources 306 located in the jurisdiction 310, the compliance tool 302 can be configured to verify that the storage of the data 314 complies with the requirements of the jurisdiction 308 or the jurisdiction 310 or both.

In embodiments, to verify the compliance, the compliance tool 302 can be configured to identify any data, for example, the data 314, being transferred within the cloud 102, prior to or simultaneously with, the transfer of the data 314. For example, the compliance tool 302 can be configured to receive a notification, from the cloud management system 104, of the data 314 being transferred within the cloud 102. Likewise, the compliance tool 302 can be configured to receive the notification from other entities or systems. Additionally, to identify a data transfer, the compliance tool 302 can be configured to monitor for any data transfers within the cloud 102, for example, the transfer of the data 314.

Once the compliance tool 302 has identified a data transfer, the compliance tool 302 can be configured to determine if the data transfer will cross jurisdictional boundaries and/or will be stored in a different jurisdiction than the data originated, for example, the transfer and storage of the data 314. To determine this, the compliance tool 302 can be configured to identify an originating jurisdiction, e.g. the jurisdiction 308, and a destination and/or storage jurisdiction, e.g. the jurisdiction 310. For example, the compliance tool 302 can be configured to identify the jurisdictions involved in the transfer by communicating with the cloud management system 104 and/or other entities or computing systems in the cloud computing environment 100. Likewise, the compliance tool 302 can be configured to examine the request for the transfer and/or storage of the data 314 and/or examine the data 314, itself, being transferred and/or stored. For example, the compliance tool 302 can be configured to identify that the data 314 is being transferred from the storage resources 320 located in jurisdiction 308 to jurisdiction 310 and that the data 314 is being stored in the storage resources 306.

Once the compliance tool 302 determines that the data 314 is being transferred and/or stored in different jurisdictions, the compliance tool 302 can be configured to determine if the transfer and/or storage of the data 314 complies with the requirements of any jurisdictions involved in the transfer and/or storage of the data 314, e.g. the jurisdiction 308 and the jurisdiction 310. To achieve this, the compliance tool 302 can be configured to maintain the record 316 of the requirements of any jurisdictions that can be involved in a transfer and/or storage of data. The record 316 can be any type of searchable data record system (e.g. database) that is capable of storing information about the data transfer and/or data storage requirements of any jurisdictions that can be involved in a transfer and/or storage of data. For example, the record 316 can store information describing the data transfer and/or data storage requirements of the jurisdiction 308 and the jurisdiction 310.

Once the requirements of the jurisdiction 308 and/or the jurisdiction 310 have been extracted, the compliance tool 302 can be configured to determine if the transfer and/or storage of the data 312 complies with the requirements of the jurisdiction 308 and/or the jurisdiction 310. The compliance tool 302 can be configured to determine if the transfer of the data 314 from the jurisdiction 308 to the jurisdiction 310 complies with the requirements of the jurisdiction 308 and/or the jurisdiction 310. For example, the compliance tool 302 can be configured to examine the requirements of the jurisdiction 308 and the jurisdiction 310 to determine if either the jurisdiction 308 or the jurisdiction 310 prohibits or restricts the transfer of any data to the other.

Likewise, the compliance tool 302 can be configured to determine if either the jurisdiction 308 and/or the jurisdiction 310 prohibits or restricts the transfer of a type of data, for example, encryption algorithms, to the other. If the jurisdiction 308 and/or the jurisdiction 310 prohibits the transfer of a type of data, the compliance tool 302 can be configured to determine the type of the data 314. The compliance tool 302 can be configured to communicate with the cloud management system 104 and/or other systems and entities of the cloud computing environment 100 to identify the type of the data 314 being transferred into the cloud 102. Additionally, the compliance tool 302 can be configured to examine the request for the transfer of the data 314 or examine the data 314, itself, being transferred to determine the type of data 314 being transferred. Once the type is determined, the compliance tool 302 can be configured to determine if the type of the data 314 complies with the requirements of the jurisdiction 308 and/or the jurisdiction 310. For example, the compliance tool 302 can be configured to determine if the jurisdiction 308 and/or the jurisdiction 310 prohibits and/or places restrictions on a certain type of data from being transferred and/or received.

Additionally, the compliance tool 302 can be configured to determine if the storage of the data 314 in the jurisdiction 310 complies with the requirements of the jurisdiction 308 and/or the jurisdiction 310. For example, the compliance tool 302 can be configured to examine the requirements of the jurisdiction 308 and/or the jurisdiction 310 to determine if either the jurisdiction 308 or the jurisdiction 310 or both prohibits or restricts the storage of any data and/or a type of data in the other. Likewise, the compliance tool 302 can be configured to determine if either the jurisdiction 308 or the jurisdiction 310 specifies certain types storage requirements for the storage of any data and/or a type of data, for example, patient medical record. The compliance tool 302 can be configured to determine, for the type of the data 314, if the storage resources that will be storing the data 314, e.g. storage resources 306, complies with the storage requirements of the jurisdiction 308 and/or the jurisdiction 310.

Once the compliance tool 302 determines if the transfer and/or storage of the data 314 complies with the requirements of the jurisdiction 308 and/or the jurisdiction 310, the compliance tool 302 can be configured to take further action based on the determined compliance. If the transfer and/or storage of the data 314 complies with the requirements of the jurisdiction 308 and/or the jurisdiction 310, the compliance tool 302 can be configured to allow the transfer and/or storage of the data 314. Likewise, the compliance tool 302 can be configured to notify the cloud management system 104 and/or other entities and systems of the cloud computing environment 100 that the transfer and/or storage of the data 314 complies with the requirements of the jurisdiction 308 and/or the jurisdiction 310.

If the transfer and/or storage of the data 314 does not comply with the requirements of the jurisdiction 308 and/or the jurisdiction 310, the compliance tool 302 can be configured to terminate the transfer and/or storage of the data 314, itself, and/or instruct other systems, entities, and/or users to terminate the transfer. For example, the compliance tool 302 can be configured to instruct the cloud management system 104 to terminate the transfer and/or storage.

Additionally, if the transfer and/or storage of the data 314 does not comply with the requirements of the jurisdiction 308 and/or the jurisdiction 310, the compliance tool 302 can be configured to modify the transfer and/or the storage of the data 314 so that it complies with the requirements of the jurisdiction 308 and/or the jurisdiction 310. For example, if the jurisdiction 310 prohibits the transfer and/or storage of the data 314 from the jurisdiction 308 or vice versa, the compliance tool 302 can be configured to modify the transfer and/or the storage of the data 314 so that it not transferred out of the jurisdiction 308 and/or is stored within the jurisdiction 308, for example, modify the transfer and storage to the storage resources 304 of the cloud 102. Likewise, for example, if storage resources 306 do not meet the requirements of the jurisdiction 310 and/or the jurisdiction 308, the compliance tool 302 can be configured to modify the transfer and/or the storage of the data 314 so that it transferred and stored in different storage resources that meet the requirements of the jurisdiction 308 and/or the jurisdiction 308, for example, the storage resources 304 and/or the storage resources 318 of the cloud 102.

Additionally, if the transfer and/or storage of the data 314 does not comply with the requirements of the jurisdiction 308 and/or the jurisdiction 310, the compliance tool 302 can be configured to modify the data 314 so that it complies with the requirements of the jurisdiction 308 and/or the jurisdiction 310. For example, if the jurisdiction 310 prohibits the transfer and/or storage of a type of data contained in the data 314 from jurisdiction 308 or vice versa, the compliance tool 302 can be configured to divide, break-up, and/or separate portions of the data 314 so that the prohibited portions are not transferred out of the jurisdiction 308 and/or is stored within the jurisdiction 308, for example, in the storage resources 304 of the cloud 102 while the allowed portions are transferred and/or stored in the storage resources 306. Likewise, for example, the requirements of the jurisdiction 310 and/or the jurisdiction 308 can specify a format and/or structure of the data 314, the compliance tool 302 can be configured to modify the data 314 so that the data 314 meets the requirements of the jurisdiction 308 and/or the jurisdiction 310.

To modify the transfer and/or storage of the data 314 and/or modify the data 314, the compliance tool 302 can be configured to modify the transfer, the storage, and/or the data 314, itself, and/or instruct other systems, entities, and/or users. For example, the compliance tool 302 can be configured to instruct the cloud management system 104 to modify the transfer, the storage, and/or the data 314.

In the above exemplary embodiments, the compliance tool 102 is illustrated as being hosted in the cloud 102. According to embodiments, the compliance tool 102 can be hosted, stored, and/or executed in any computing system, whether part of the cloud or external to the cloud, and/or any cloud of the cloud computing environment 100.

Likewise, in the above exemplary embodiments, the data 314 is migrated into or within a cloud 102. While the above exemplary embodiments describes data being migrated into the cloud 102, the data migration tool 302 can be configured to migrate data out of the cloud 102 utilizing the processes described above. Additionally, accordingly to other exemplary embodiments, the compliance tool 302 can verify compliance of data that is migrated between different cloud networks, in which part of the different clouds or the entire clouds can be located in different jurisdictions. In these exemplary embodiments, the compliance tool 302 can be located in the originating cloud, the destination cloud, or both. As such the compliance tool 302 can be hosted, implemented, stored, and/or executed by any computing systems of the different clouds and/or computing systems external to the different clouds.

In the above exemplary embodiments, the cloud computing network 100 includes two jurisdictions. One skilled in the art will realize that the cloud computing environment can include any number of jurisdictions that can be applicable to a data transfer and/or storage. As such, the compliance tool 302 can be configured to verify compliance of any jurisdictional transfer and storage requirements applicant to a data transfer and/or storage. For example, the cloud computing environment 100 can include three jurisdictions. In this example, a data transfer can pass through all three jurisdictions. As such, the compliance tool 302 can be configured to verify compliance with the transfer and storage requirements of all three jurisdictions, and prohibit the transfer, modify the transfer, and/or modify the data to comply with the transfer and storage requirements. For example, if transfer and/or storage in one of the three jurisdictions does not comply, the compliance tool 302 can be configured to modify the transfer and/or storage so that the data is not transferred through or stored in the non-complying jurisdiction.

In exemplary embodiments, as described above, the compliance tool 302 can be configured to notify the computing systems and entities of the cloud computing network 100. Likewise, the compliance tool 302 can be configured to notify the jurisdictions, such as the jurisdiction 308 and the jurisdiction 310, of the compliance with the requirements. Additionally, the compliance tool 302 can be configured to notify the jurisdictions of the data transfer and/or storage, if the requirements of the jurisdictions specify reporting of the data transfer and/or storage. As such, the compliance tool 302 can place the data transfer and/or storage in compliance with the requirements of the jurisdictions. The compliance tool 302 can be configured to include the necessary logic, commands, instructions, and protocols to communicate with the jurisdictions utilizing any type of electronic communications channel.

In the above exemplary embodiments, the compliance tool 302 can be utilized by operators of the cloud 102 and/or entities or user transferring and/or storing data to verify that data transfers and/or storage will comply with jurisdictional data transfer and data storage requirements. Likewise, in the above exemplary embodiments, the compliance tool 302 can be configured to automatically verify that data transfers and/or storage will comply with jurisdictional data transfer and data storage requirements. The compliance tool 302 can be configured to perform the automatic verification (notification and modification, if necessary) at the time of the request of the data transfer and/or storage, at the initiation of the data transfer and/or storage, during the data transfer and/or storage, and/or after the data transfer and/or storage.

In the exemplary embodiments described above, the compliance tool 302 can be configured to verify that data transfers and/or data storage complies with jurisdictional data transfer and data storage requirements when transferring and/or storing data in different jurisdictions. The compliance tool. 302 can also be configured to verify that data transfers and/or data storage complies with jurisdictional data transfer and data storage requirements whether or not the data is transferred to and/or stored in a different jurisdiction, e.g. transfers and/or storage within one jurisdiction. For example, the jurisdictional data transfers and data storage requirements for the jurisdiction 308 can apply to transfers and/or storage within the jurisdiction 308 as well as transfers to and storage in jurisdiction 310. For the data transfers and/or storage within a single jurisdiction, the compliance tool 302 can be configured to verify the transfer and/or storage complies with the requirements of the jurisdictions and can be configured to prevent and/or modify the transfer and/or storage using any of the processes described above and below.

Figure 5:
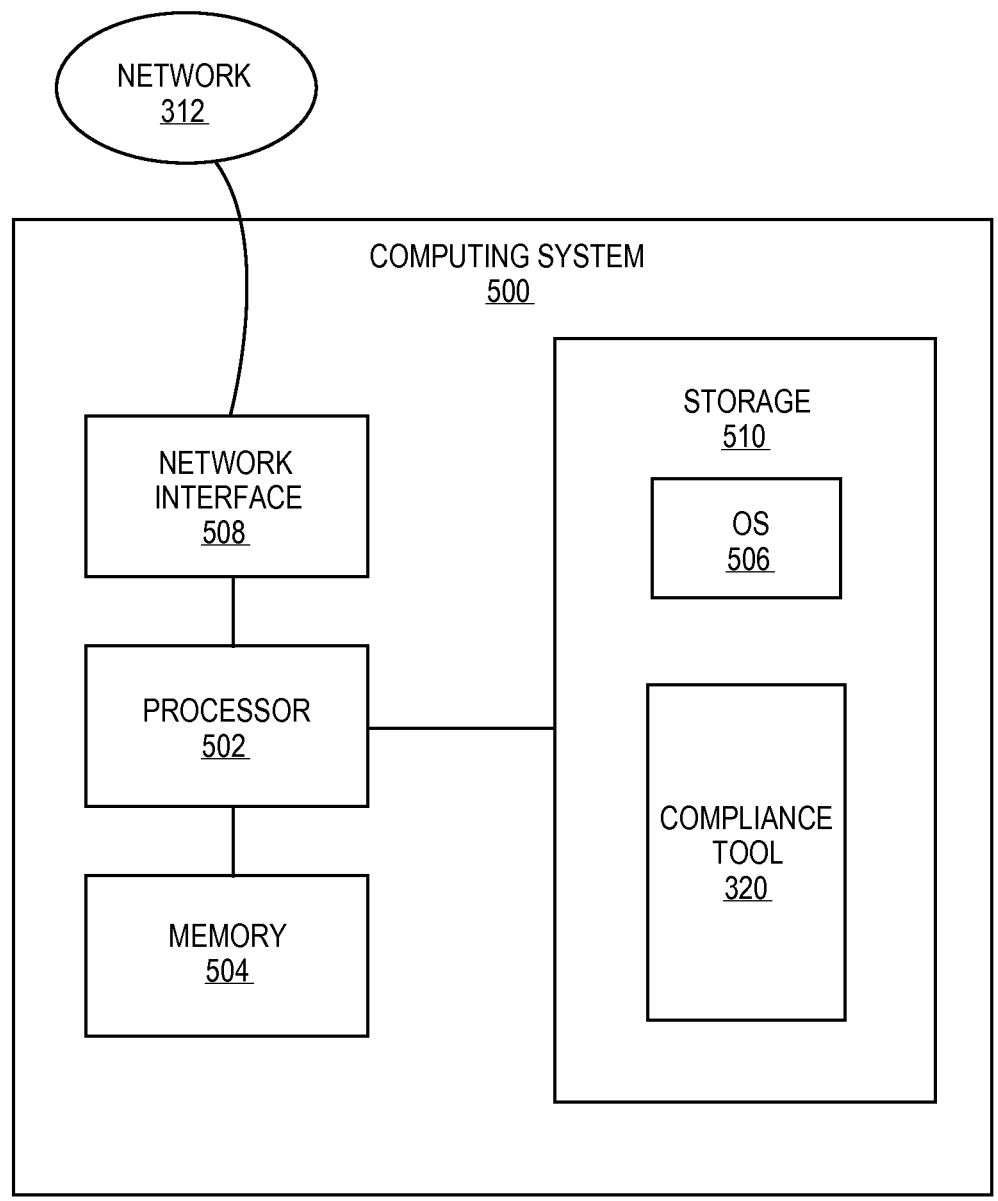
FIG. 5 illustrates an exemplary hardware configuration for a computing system supporting the compliance tool, according to various embodiments.

FIG. 5 illustrates an exemplary diagram of a computing system 500, which can implement the compliance tool 302, and configured to communicate with the one or more communications networks 312, according to embodiments. The computing system 500 can represent any one of the computing systems contained in the cloud computing environment 100. In embodiments as shown, the computing system 500 can comprise a processor 502 communicating with a memory 504, such as electronic random access memory, operating under control of or in conjunction with operating system 506. The operating system 506 can be, for example, a distribution of the Linux™ operating system, such as SELinux, the Unix™ operating system, or other open-source or proprietary operating system or platform. The processor 502 also communicates with one or more computer readable storage media or devices 510, such as hard drives, optical storage, and the like, which can store the application program embodiment of the compliance tool 302. The processor 502 further communicates with a network interface 508, such as an Ethernet or wireless data connection, which in turn communicates with one or more communications networks 312, such as the Internet or other public or private networks.

The processor 502 also communicates with the application program embodiment of the compliance tool 302 to execute control logic and allow for the processes as described above and below. Other configurations of the computing system 500, associated network connections, and other hardware and software resources are possible.

While FIG. 5 illustrates the computing system 500 as a standalone system including a combination of hardware and software, the computing system 500 can include multiple systems operating in cooperation. The application program embodiment of the compliance tool 302 can be implemented as a software application program capable of being executed by the computing system 500, as illustrated, or other conventional computer platforms. Likewise, the compliance tool 302 can also be implemented as a software module or program module capable of being incorporated in other software application programs, such as the cloud management system 104. In either case, the compliance tool 302 can be implemented in any type of conventional proprietary or open-source computer language. When implemented as a software application program or program code, the compliance tool 302 can be stored in a computer readable storage medium or device, such as storage 510 accessible by the computing system 500. Likewise, during execution, a copy of the compliance tool 302 can be stored in the memory 504.

Figure 6A:
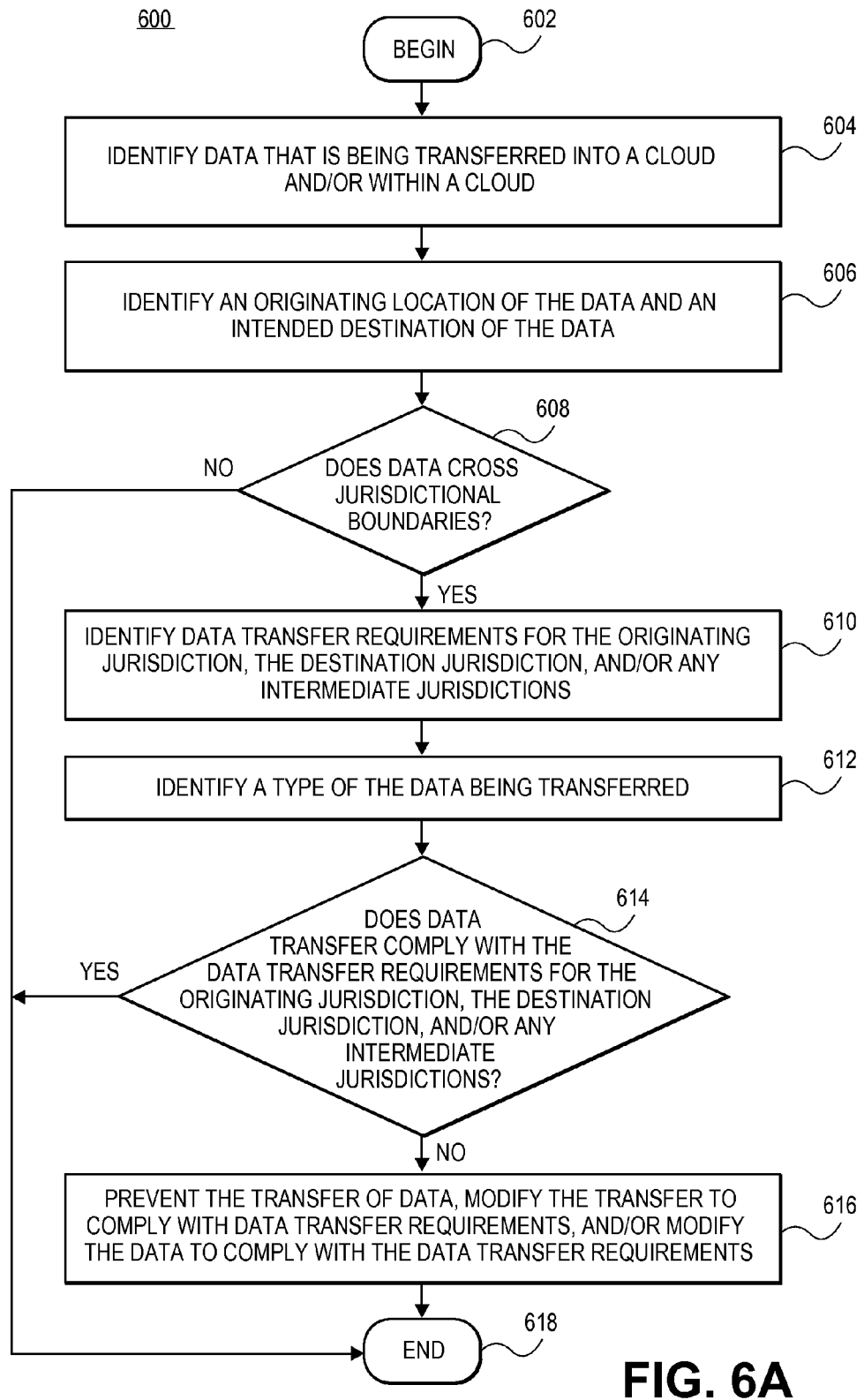
FIGS. 6A and 6B illustrate flowcharts of exemplary processes for checking compliance of data being transferred or stored across jurisdictional boundaries in a cloud computing environment, according to various embodiments.

FIG. 6A illustrates a flow diagram of an exemplary process 600 for verifying compliance with jurisdictional transfer requirements of data being migrated into or within a cloud, according to various embodiments. In 602, processing can begin.

In 604, the compliance tool 302 can identify data that is being transferred into a cloud and/or within a cloud. For example, the compliance tool 302 can identify the data 314 that is being transferred into or within the cloud 102. The compliance tool 302 can identify the transfer of the data by communicating with and/or receiving notification from other systems or entities of the cloud computing environment 100 such as the cloud management system 104, the computing systems 300, and/or entities and/or users associated with the systems. Likewise, the compliance tool 302 can monitor for events in the cloud 102 to identify the transfer of the data.

In 606, the compliance tool 302 can identify an originating location of the data and an intended destination of the data. For example, the compliance tool 606 can identify that the data 314 is being transferred from the jurisdiction 308 to the jurisdiction 310. The compliance tool 302 can identify the originating location of the data and the intended destination of the data by communicating with and/or receiving the locations from other systems or entities of the cloud computing environment 100 such as the cloud management system 104, the computing systems 300, and/or entities and/or users associated with the systems. Likewise, the compliance tool 302 can examine the request for the transfer of the data and/or examine the data, itself.

In 608, the compliance tool 302 can determine if the transfer of data crosses jurisdictional boundaries. The compliance tool 302 can compare the originating location and the intended destination to determine if the locations are different. For example, the compliance tool 302 can determine that the data 312 is being transferred from the jurisdiction 308 to the jurisdiction 310.

In 610, the compliance tool 302 can identify the data transfer requirements for the originating jurisdiction and the destination jurisdiction and/or any other intermediate jurisdictions. The compliance tool 302 can search the record 316 and extract the data transfer requirements for the originating jurisdiction and the destination jurisdiction. For example, the compliance tool 302 can search and extract the data transfer requirements for the jurisdiction 308 and the jurisdiction 310.

In 612, the compliance tool 302 can identify a type of the data being transferred. The type of data being transferred can be based on attributes of the data such as the subject matter of the data, content of the data, and the like. The compliance tool 302 can identify the type of the data by communicating with and/or receiving the type of the data from other systems or entities of the cloud computing environment 100 such as the cloud management system 104, the computing systems 300, and/or entities and/or users associated with the systems. Likewise, the compliance tool 302 can examine the request for the transfer of the data and/or examine the data, itself.

In 614, the compliance tool 302 can determine if the data transfer complies with the data transfer requirements of the originating jurisdiction, the destination jurisdiction, and/or any intermediate jurisdiction. For example, the compliance tool 302 can compare the data transfer requirements of the jurisdiction 308 and the jurisdiction 310 to determine if either jurisdictions prohibits or restricts the transfer of the data 314 to the other. Likewise, the compliance tool 302 can compare the type of the data to the data transfer requirements of the jurisdiction 308 and the jurisdiction 310 to determine if either jurisdictions prohibits or restricts the transfer of the type of the data 314 to the other. If the transfer of data complies with the requirements of the originating jurisdiction and the destination jurisdiction, the transfer can proceed, and the compliance tool 302 can notify the systems or entities of the cloud computing environment 100 such as the cloud management system 104, the computing systems 300, and/or entities and/or users associated with the systems of the compliance.

In 616, if the transfer of data does not comply, the compliance tool 302 can prevent the transfer of data, modify the transfer of data to comply with the data transfer requirements, and/or modify the data to comply with the data transfer requirements. For example, the compliance tool 302 can terminate the transfer the data 314, itself, and/or instruct other systems, entities, and/or users to terminate the transfer.

Likewise, for example, if the jurisdiction 310 prohibits the transfer of the data 314 from the jurisdiction 308 or vice versa, the compliance tool 302 can modify the transfer of the data 314 so that it not transferred out of the jurisdiction 308 and/or is stored within the jurisdiction 308, for example, modify the transfer and storage to the storage resources 304 of the cloud 102.

Additionally, for example, if the jurisdiction 310 prohibits the transfer of a type of data contained in the data 314 from jurisdiction 308 or vice versa, the compliance tool 302 can divide, break-up, and/or separate portions of the data 314 so that the prohibited portions are not transferred out of the jurisdiction 308 and/or is stored within the jurisdiction 308, for example, in the storage resources 304 of the cloud 102 while the allowed portions are transferred and/or stored in the storage resources 306. Likewise, for example, the requirements of the jurisdiction 310 and/or the jurisdiction 308 can specify a format and/or structure of the data 314, the compliance tool 302 can be configured to modify the data 314 so that the data 314 meets the requirements of the jurisdiction 308 and/or the jurisdiction 310. To modify the transfer of the data 314 and/or modify the data 314, the compliance tool 302 can be configured to modify the transfer, the storage, and/or the data 314, itself, and/or instruct other systems, entities, and/or users.

In 618, the process can end, but the process can return to any point and repeat.

Figure 6B:
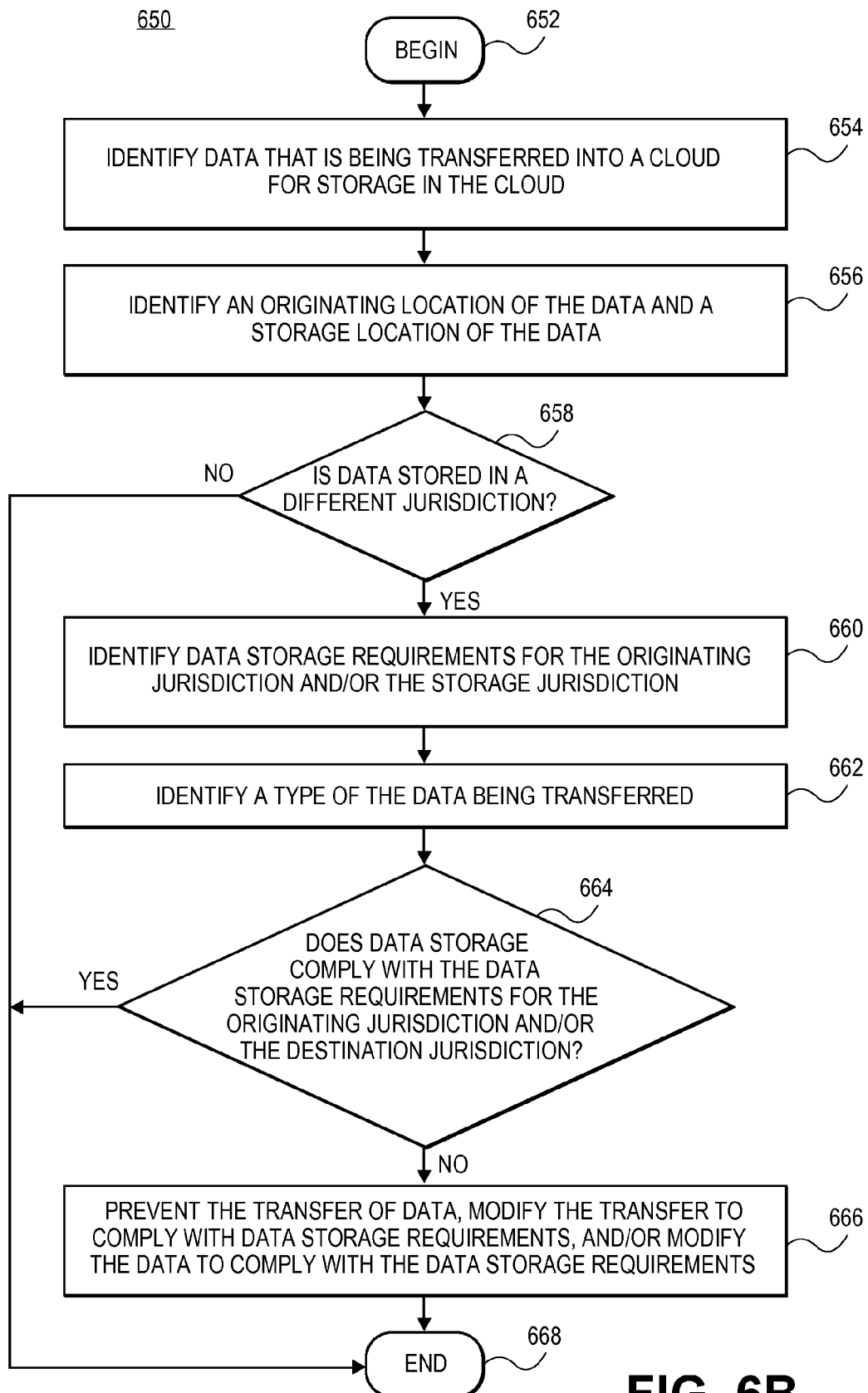

FIG. 6B illustrates a flow diagram of an exemplary process 650 for verifying compliance with jurisdictional storage requirements of data being migrated into or within a cloud, according to various embodiments. In 652, processing can begin.

In 654, the compliance tool 302 can identify data that is being transferred and stored in a cloud and/or within a cloud. For example, the compliance tool 302 can identify the data 314 that is being transferred and stored in or within the cloud 102. The compliance tool 302 can identify the storage of the data by communicating with and/or receiving notification from other systems or entities of the cloud computing environment 100 such as the cloud management system 104, the computing systems 300, and/or entities and/or users associated with the systems. Likewise, the compliance tool 302 can monitor for events in the cloud 102 to identify the storage of the data.

In 656, the compliance tool 302 can identify an originating location of the data and a storage location of the data. For example, the compliance tool 606 can identify that the data 314 is being transferred from the jurisdiction 308 for storage on the storage resources 306 located in the jurisdiction 310. The compliance tool 302 can identify the originating location of the data and the storage location of the data by communicating with and/or receiving the locations from other systems or entities of the cloud computing environment 100 such as the cloud management system 104, the computing systems 300, and/or entities and/or users associated with the systems. Likewise, the compliance tool 302 can examine the request for the storage of the data and/or examine the data, itself.

In 658, the compliance tool 302 can determine if the data is stored in a different jurisdiction. The compliance tool 302 can compare the originating location and the storage location to determine if the locations are different. For example, the compliance tool 302 can determine that the data 312 is being transferred from the jurisdiction 308 for storage in the storage resources 306 of the jurisdiction 310.

In 660, the compliance tool 302 can identify the storage requirements for the originating jurisdiction and the storage jurisdiction. The compliance tool 302 can search the record 316 and extract the data storage requirements for the originating jurisdiction and the storage jurisdiction. For example, the compliance tool 302 can search and extract the data storage requirements for the jurisdiction 308 and the jurisdiction 310.

In 662, the compliance tool 302 can identify a type of the data being stored. The type of data being stored can be based on attributes of the data such as the subject matter of the data, content of the data, and the like. The compliance tool 302 can identify the type of the data by communicating with and/or receiving the type of the data from other systems or entities of the cloud computing environment 100 such as the cloud management system 104, the computing systems 300, and/or entities and/or users associated with the systems. Likewise, the compliance tool 302 can examine the request for the transfer of the data and/or examine the data, itself.

In 664, the compliance tool 302 can determine if the data storage complies with the data storage requirements of the originating jurisdiction and the storage jurisdiction. For example, the compliance tool 302 can compare the data storage requirements of the jurisdiction 308 and the jurisdiction 310 to determine if either jurisdictions prohibits or restricts the storage of the data 314. Likewise, the compliance tool 302 can compare the type of the data to the data storage requirements of the jurisdiction 308 and the jurisdiction 310 to determine if either jurisdictions prohibits or restricts or specifics storage requirements for the storage of the type of the data 314. If the storage of data complies with the requirements of the originating jurisdiction and the storage jurisdiction, the storage can proceed, and the compliance tool 302 can notify the systems or entities of the cloud computing environment 100 such as the cloud management system 104, the computing systems 300, and/or entities and/or users associated with the systems of the compliance.

In 666, if the storage of data does not comply, the compliance tool 302 can prevent the storage of data, modify the storage of data to comply with the data storage requirements, and/or modify the data to comply with the data storage requirements. For example, the compliance tool 302 can terminate the storage the data 314, itself, and/or instruct other systems, entities, and/or users to terminate the storage.

Likewise, for example, if storage resources 306 do not meet the requirements of the jurisdiction 310 and/or the jurisdiction 308, the compliance tool 302 can be configured to modify the transfer of the data 314 so that it transferred and stored in different storage resources that meet the requirements of the jurisdiction 308 and/or the jurisdiction 308, for example, the storage resources 304 and/or the storage resources 318 of the cloud 102.

Additionally, for example, if the jurisdiction 310 prohibits the transfer of a type of data contained in the data 314 from jurisdiction 308 or vice versa, the compliance tool 302 can divide, break-up, and/or separate portions of the data 314 so that the prohibited portions are not transferred out of the jurisdiction 308 and/or is stored within the jurisdiction 308, for example, in the storage resources 304 of the cloud 102 while the allowed portions are transferred and/or stored in the storage resources 306. Likewise, for example, the requirements of the jurisdiction 310 and/or the jurisdiction 308 can specify a format and/or structure of the data 314, the compliance tool 302 can be configured to modify the data 314 so that the data 314 meets the requirements of the jurisdiction 308 and/or the jurisdiction 310. To modify the transfer of the data 314 and/or modify the data 314, the compliance tool 302 can be configured to modify the transfer, the storage, and/or the data 314, itself, and/or instruct other systems, entities, and/or users.

In 668, the process can end, but the process can return to any point and repeat.

Certain embodiments may be performed as a computer application program. The computer application program may exist in a variety of forms both active and inactive. For example, the application program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software application program(s) on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
identifying a transfer of data from a first location in a first jurisdiction to a storage resource located in a second jurisdiction in a cloud network, wherein a jurisdiction is a geographical area to which certain legal authority applies, and wherein the second jurisdiction is different than the first jurisdiction;
identifying a requirement, specified by the first jurisdiction, to store the data in view of an attribute of the data;
determining, by a processor, whether storing the data in the storage resource in the second jurisdiction in the cloud network complies with the requirement;
identifying a second requirement, specified by the second jurisdiction, to store the data in view of the attribute of the data;
determining whether storing the data in the storage resource in the second jurisdiction in the cloud network complies with the second requirement; and
preventing transfer of the data if storing the data in the second jurisdiction does not comply with the second requirement of the second jurisdiction.

2. The method of claim 1 further comprising:
preventing transfer of the data if storing the data in the second jurisdiction does not comply with the requirement of the first jurisdiction.

3. The method of claim 1 further comprising:
modifying the data to comply with the requirement of the first jurisdiction.

4. The method of claim 1, wherein the requirement comprises one of security for storing the data, access controls of the data, content of the data, or format of the data.

5. The method of claim 1 further comprising:
identifying the attribute of the data.

6. The method of claim 1 further comprising:
modifying the data to comply with the second requirement of the second jurisdiction.

7. A non-transitory computer storage medium comprising instructions to cause the processor to perform operations according to claim 1.

8. An apparatus, comprising:
a memory to store instructions; and
the processor, operatively coupled to the memory, to execute the instructions to perform the operations of claim 1.

9. A method comprising:
identifying a transfer of data from a first jurisdiction to a portion of a cloud network located in a second jurisdiction, wherein a jurisdiction is a geographical area to which certain legal authority applies, and wherein the second jurisdiction is different than the first jurisdiction;
identifying a requirement, specified by the first jurisdiction, to transfer the data out of the first jurisdiction;
determining, by a processor, whether transferring the data to the cloud network located in the second jurisdiction complies with the requirement;
identifying a second requirement, specified by the second jurisdiction, to transfer the data into the second jurisdiction;
determining whether transferring the data to the cloud network located in the second jurisdiction complies with the second requirement; and
preventing transfer of the data to the cloud network located in the second jurisdiction if the transfer does not comply with the second requirement of the second jurisdiction.

10. The method of claim 9 further comprising:
preventing transfer of the data to the cloud network located in the second jurisdiction if the transfer does not comply with the requirement of the first jurisdiction.

11. The method of claim 9, wherein the requirement comprises one of a prohibition on transferring the data out of the first jurisdiction or a prohibition of transferring the data to specified jurisdictions.

12. The method of claim 9, wherein the second requirement comprises one of a prohibition transferring any data into the second jurisdiction from specified jurisdictions or a prohibition transferring certain types of data into the second jurisdiction from the specified jurisdictions.

13. The method of claim 9 further comprising:
identifying an attribute of the data, wherein the requirement is in view of the attribute of the data.

14. The method of claim 9, wherein the first jurisdiction and the second jurisdiction are different countries.

15. A non-transitory computer storage medium comprising instructions to cause the processor to perform operations according to claim 9.

16. An apparatus, comprising:
a memory to store instructions; and
the processor, operatively coupled to the memory, to execute the instructions to perform the operations of claim 9.

* * * * *